US012594677B2

(12) United States Patent
Ryu et al.

(10) Patent No.:  US 12,594,677 B2
(45) Date of Patent:  Apr. 7, 2026

(54) MSA-BASED ROBOT CONTROL DEVICE AND METHOD FOR MANAGING ROBOT THEREOF

(71) Applicants: Hyundai Motor Company, Seoul (KR); Kia Corporation, Seoul (KR)

(72) Inventors: Jung Min Ryu, Hwaseong-Si (KR); Deuk Jun Kim, Suwon-Si (KR); Myung Hwa Ji, Suwon-Si (KR); Seok Won Kim, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 265 days.

(21) Appl. No.: 18/236,997

(22) Filed: Aug. 23, 2023

(65) Prior Publication Data

US 2024/0351219 A1  Oct. 24, 2024

(30) Foreign Application Priority Data

Apr. 18, 2023  (KR) ........................ 10-2023-0050827

(51) Int. Cl.
B25J 13/06 (2006.01)
B25J 9/16 (2006.01)

(52) U.S. Cl.
CPC .................................... B25J 13/06 (2013.01)

(58) Field of Classification Search
CPC ..... B25J 13/06; B25J 9/16; B25J 9/161; B25J 9/1674; B25J 9/1694; G05B 23/027; G05B 23/024; G05B 23/0264; H04W 4/46
USPC ....................................................... 700/264
See application file for complete search history.

(56) References Cited

U.S. PATENT DOCUMENTS

| 11,188,376 | B1 * | 11/2021 | Alexander | .......... G06F 9/45558 |
| 11,500,393 | B2 | 11/2022 | Sohn | |
| 2019/0084161 | A1 * | 3/2019 | Tokuhashi | ............. B25J 13/006 |
| 2021/0034047 | A1 * | 2/2021 | Dix | ...................... G05B 23/027 |
| 2021/0199445 | A1 * | 7/2021 | Sergeev | .............. B60W 60/001 |
| 2022/0294843 | A1 | 9/2022 | Kim et al. | |
| 2023/0032264 | A1 | 2/2023 | Song et al. | |

(Continued)

FOREIGN PATENT DOCUMENTS

| KR | 102432284 B1 | 8/2022 |
| KR | 10-2022-0128154 A | 9/2022 |

OTHER PUBLICATIONS

"[GRPC] What are gPRC Remote Procedure Calls?," uju, 4 pages, Jul. 23, 2020.

(Continued)

*Primary Examiner* — Kira Nguyen
(74) *Attorney, Agent, or Firm* — Banner & Witcoff, Ltd.

(57) ABSTRACT

A robot control device and a robot management method thereof are provided. The robot control device includes a detection module that recognizes an abnormal state generated in at least one external robot based on raw data received from the at least one external robot and provides an external user device with an alarm associated with the abnormal state based on a predetermined abnormal state response rule, a log module that stores the raw data and data associated with the abnormal state, and a robot management module that transmits a command to control at least one of an operation or a state of the at least one external robot to the at least one external robot, based on the abnormal state response rule.

19 Claims, 10 Drawing Sheets

(56)        References Cited

U.S. PATENT DOCUMENTS

| | | | |
|---|---|---|---|
| 2023/0205181 A1* | 6/2023 | Kishikawa | B60W 50/0205 |
| | | | 701/2 |
| 2024/0036571 A1* | 2/2024 | Goldman | G05D 1/2279 |
| 2024/0149892 A1* | 5/2024 | Arun | B60W 60/00186 |

OTHER PUBLICATIONS

Hyup, Jo Dae, "Understanding API Gateways for Implementing MSA Architecture #1," Jodaehyup (http:/bcho.tistory.com), 30 pages.

* cited by examiner

Figure 4:
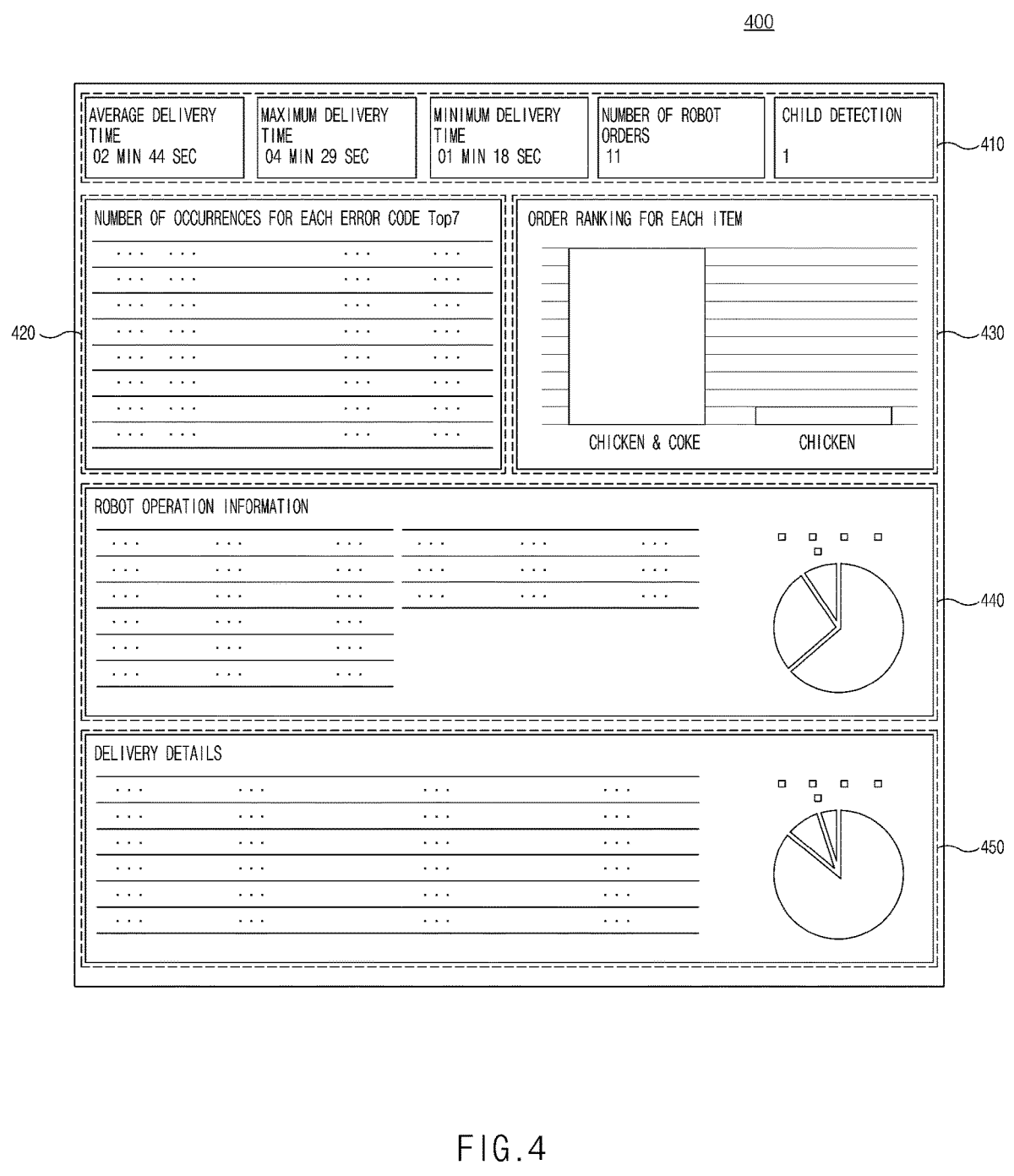

400

| AVERAGE DELIVERY TIME 02 MIN 44 SEC | MAXIMUM DELIVERY TIME 04 MIN 29 SEC | MINIMUM DELIVERY TIME 01 MIN 18 SEC | NUMBER OF ROBOT ORDERS 11 | CHILD DETECTION 1 |
|---|---|---|---|---|

410

NUMBER OF OCCURRENCES FOR EACH ERROR CODE Top7

420

ORDER RANKING FOR EACH ITEM

CHICKEN & COKE          CHICKEN

430

ROBOT OPERATION INFORMATION

440

DELIVERY DETAILS

MSA-BASED ROBOT CONTROL DEVICE AND METHOD FOR MANAGING ROBOT THEREOF

CROSS-REFERENCE TO RELATED APPLICATION

This application claims the benefit of priority to Korean Patent Application No. 10-2023-0050827, filed in the Korean Intellectual Property Office on Apr. 18, 2023, the entire contents of which are incorporated herein by reference.

TECHNICAL FIELD

The present disclosure relates to a robot control device and a robot management method thereof, and more particularly, relates to technologies of monitoring and controlling a robot in a micro service architecture (MSA)-based robot control device.

BACKGROUND

A micro service architecture (MSA) is to be applied to a large-scale system, which refers to an architecture which decomposes and serves a function into small units (or modules) which may be separately executed and may be independently arranged. Such MSA facilitates deployment for each specific service without stopping all services. Particularly, the MSA may quickly reflect and deploy requirements. Furthermore, because the MSA is easy to expand a specific service and has a low possibility that a fault will expand to all the services, it is easy to isolate a partial fault.

However, when controlling a robot depending on a stylized scenario when managing the robot, or when requesting to manually control the robot, a robot control device may be difficult to perform an immediate and quick response in a situation where an abnormality in the robot occurs or where a risk of the robot occurs and may facilitate a response only when a manager performs continuously monitoring. Furthermore, there is a need for the robot control device to reduce a delay f a communication time for an immediate response in controlling the robot.

SUMMARY

The present disclosure has been made to solve the above-mentioned problems occurring in the prior art while advantages achieved by the prior art are maintained intact.

An aspect of the present disclosure provides a robot control device for facilitating an immediate and rapid response and measure when detecting an abnormal state of a robot and a robot management method thereof.

Another aspect of the present disclosure provides a robot control device for reducing a delay of communication with the outside and improving communication performance and a robot management method thereof.

Another aspect of the present disclosure provides a robot control device for processing authentication for each service (or module) of a robot control device in an integrated manner to increase authentication processing efficiency and a robot management method thereof.

Another aspect of the present disclosure provides a robot control device for providing statistical data associated with operation and an abnormal state of a robot and a robot management method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a micro service architecture (MSA)-based robot control device may include a detection module that recognizes an abnormal state generated in at least one external robot based on raw data received from the at least one external robot and provides an external user device with an alarm associated with the abnormal state based on a predetermined abnormal state response rule, a log module that stores the raw data and data associated with the abnormal state, and a robot management module that transmits a command to control at least one of an operation or a state of the at least one external robot to the at least one external robot, based on the abnormal state response rule.

According to an embodiment, the abnormal state response rule may include a rule associated with whether to provide an alarm depending on at least one of a state of a robot, a location of the robot, a speed of the robot, or an environment around the robot and a response operation of the robot.

According to an embodiment, The MSA-based robot control device may further include a gateway module that processes communication between each module included in the robot control device and the at least one external robot or the external user device. According to an embodiment, the gateway module may communicate with the at least one external robot using a g remote procedure calls (gRPC) protocol and may communicate with the external user device using a restful application programming interface (REST API) protocol.

According to an embodiment, the MSA-based robot control device may further include an authentication processing module that performs authentication processing procedures for the respective modules included in the robot control device in an integrated manner, when communicating between at least some of the at least one external robot, the external user device, or the respective modules included in the robot control device.

According to an embodiment, the MSA-based robot control device may further include a statistics module that generates a statistical report including information about the number of times that the abnormal state is generated according to a component, an operation type, a movement speed, a surrounding environment, or a location of the at least one external robot, based on the raw data and the data associated with the abnormal state and provides at least one of the detection module or the external user device with the statistical report.

According to an embodiment, the detection module may update the abnormal state response rule based on the statistical report.

According to an embodiment, the detection module may generate a map associated with an operation area of the at least one external robot, based on sensor data received from the at least one external robot, may set the operation area of the at least one external robot based on the map, may receive coordinate information based on the map indicating a location of the at least one external robot from the at least one external robot, and may recognize that the abnormal state is generated, when detecting that the at least one external robot deviates from the set operation area based on the coordinate information.

3

According to an embodiment, the detection module may divide the map into a plurality of areas, may set the number of robots operable for each of the plurality of divided areas, and may recognize that the abnormal state is generated, when detecting that the number of robots which are operating in each of the plurality of areas is greater than a specified threshold.

According to an embodiment, the log module may index the raw data and the data associated with the abnormal state and may determine a storage duration for the indexed raw data and data associated with the abnormal state based on a specified storage policy.

According to an embodiment, the log module may receive a request of data conforming to a specified condition between the raw data or the data associated with the abnormal state from the at least one external robot or the external user device and may provide the at least one external robot or the external user device with the data conforming to the specified condition, in response to the request.

According to another aspect of the present disclosure, a robot management method of a micro service architecture (MSA)-based robot control device may include receiving raw data from at least one external robot, recognizing an abnormal state generated in the at least one external robot based on the raw data, providing an external user device with an alarm associated with the abnormal state based on a predetermined abnormal state response rule, and transmitting a command to control at least one of an operation or a state of the at least one external robot to the at least one external robot, based on the abnormal state response rule.

According to an embodiment, the abnormal state response rule may include a rule associated with whether to provide an alarm depending on at least one of a state of a robot, a location of the robot, a speed of the robot, or an environment around the robot and a response operation of the robot.

According to an embodiment, the robot management method may further include communicating with the at least one external robot using a gRPC protocol and communicating with the external user device using a REST API protocol.

According to an embodiment, the robot management method may further include storing the raw data and data associated with the abnormal state.

According to an embodiment, the robot management method may further include indexing the raw data and the data associated with the abnormal state and determining a storage duration for the indexed raw data and data associated with the abnormal state based on a specified storage policy.

According to an embodiment, the robot management method may further include receiving a request of data conforming to a specified condition between the raw data or the data associated with the abnormal state from the at least one external robot or the external user device and providing the at least one external robot or the external user device with the data conforming to the specified condition, in response to the request.

According to an embodiment, the robot management method may further include generating a statistical report including information about the number of times that the abnormal state is generated according to a component, an operation type, a movement speed, a surrounding environment, or a location of the at least one external robot, based on the raw data and the data associated with the abnormal state, and providing at least one of the at least one external robot or the external user device with the statistical report.

According to an embodiment, the robot management method may further include updating the abnormal state response rule based on the statistical report.

4

According to an embodiment, the recognizing of the abnormal state may include generating a map associated with an operation area of the at least one external robot, based on sensor data received from the at least one external robot, setting the operation area of the at least one external robot based on the map, receiving coordinate information based on the map indicating a location of the at least one external robot from the at least one external robot, and recognizing that the abnormal state is generated, when detecting that the at least one external robot deviates from the set operation area based on the coordinate information.

According to an embodiment, the robot management method may further include dividing the map into a plurality of areas, setting the number of robots operable for each of the plurality of divided areas, and recognizing that the abnormal state is generated, when detecting that the number of robots which are operating in each of the plurality of areas is greater than a specified threshold.

BRIEF DESCRIPTION OF THE DRAWINGS

The above and other objects, features and advantages of the present disclosure will be more apparent from the following detailed description taken in conjunction with the accompanying drawings:

FIG. 4 is a drawing for describing an operation of a robot control device according to an embodiment of the present disclosure;

DETAILED DESCRIPTION

Figure 1:
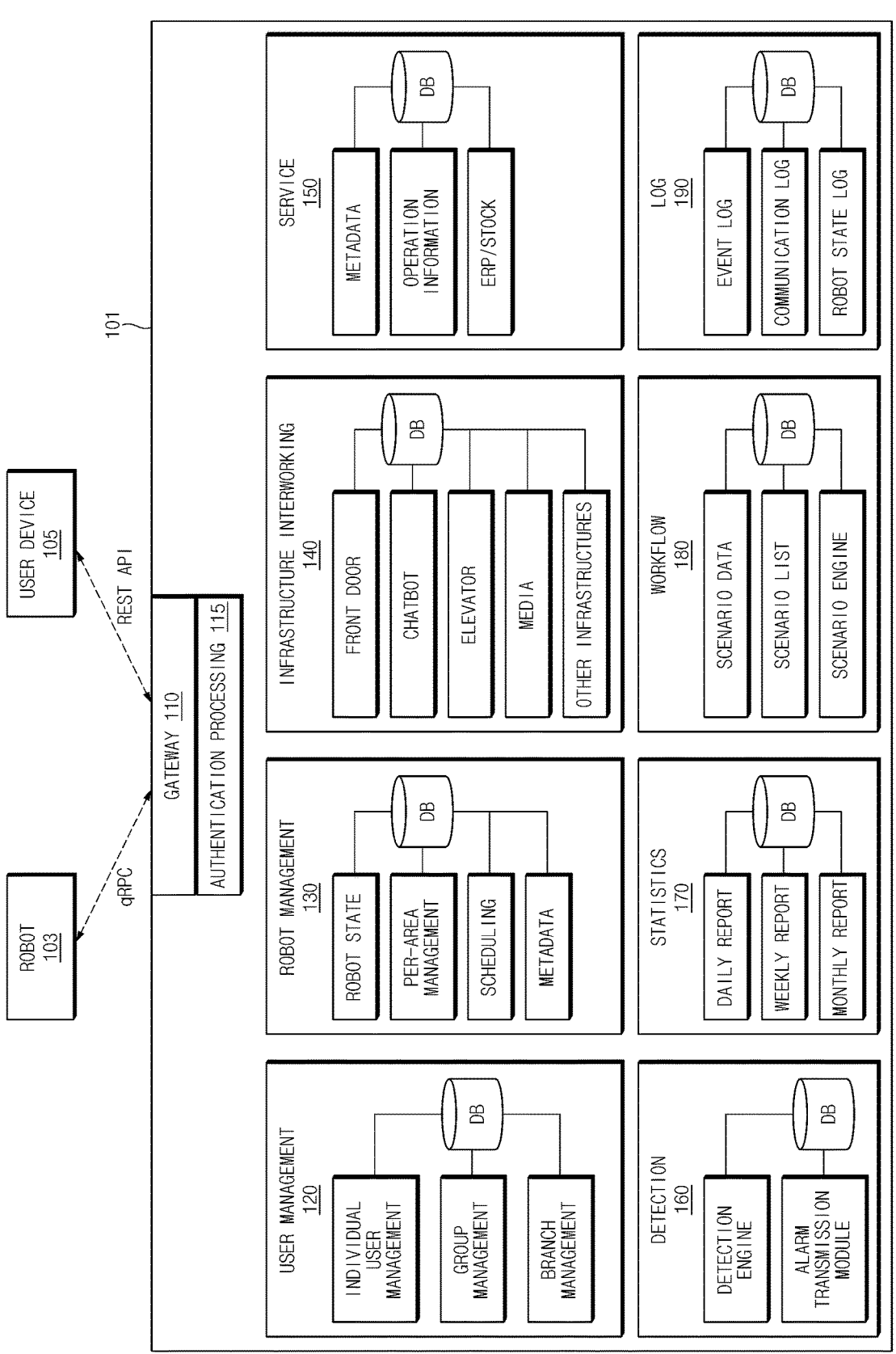
FIG. 1 is a block diagram of a robot control device according to an embodiment of the present disclosure.

Hereinafter, some embodiments of the present disclosure will be described in detail with reference to the accompanying drawings. In adding the reference numerals to the components of each drawing, it should be noted that the identical component is designated by the identical numerals even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 10.

FIG. 1 is a block diagram of a robot control device according to an embodiment of the present disclosure.

According to an embodiment, a micro service architecture (MSA)-based robot control device 101 may include a gateway module 110, an authentication processing module 115, a user management module 120, a robot management module 130, an infrastructure interworking module 140, a service module 150, a detection module 160, a statistics module 170, a workflow module 180, and a log module 190. For example, the respective modules shown in FIG. 1 may correspond to separate services in an MSA.

According to an embodiment, the gateway module 110 may process communication between each module included in the robot control device 101 and at least one external robot 103 or an external user device 105 (e.g., a user terminal, a user application, and/or a management device). For example, the gateway module 110 may transmit an access request, an authentication request, and/or a data request from the external robot 103 or the external user device 105 to a module of the robot control device 101, which corresponds to the data request. According to an embodiment, the gateway module 110 may support a plurality of communication protocols. For example, the gateway module 110 may communicate with the at least one external robot 103 using a g remote procedure calls (gRPC) protocol and may communicate with the external user device 105 using a restful application programming interface (REST API) protocol. For example, the gateway module 110 may communicate with the external robot 103 using the gRPC protocol, thus supporting relatively faster data transmission and reception than using a web real-time communication (WebRTC) protocol (or a hypertext transfer protocol (HTTP)).

For example, Table 1 below represents a difference between the gRPC protocol and the WebRTC protocol (or the HTTP).

TABLE 1

| Characteristics | HTTP | gRPC | Advantages when applying gRPC to robots |
|---|---|---|---|
| Communication contract | Optional | Mandatory | Secure security as communication is possible only when contract is known |
| Protocol | HTTP | HTTP/2 | Secure communication efficiency by using improved HTTP protocol |
| Payload | JSON | Protobuf | Increase security using Protobuf for performing binary encryption compared to readable JSON |

6

TABLE 1-continued

| Characteristics | HTTP | gRPC | Advantages when applying gRPC to robots |
|---|---|---|---|
| Normativity | Loose protocol | Compulsion | Enforce communication protocol to prevent miscommunication |
| Streaming | Unsupported | Supported | It is possible to deliver information in real time by supporting bidirectional communication. |
| Security | Selectable | TLS Compulsion | It is possible to encrypt and deliver communication contents by enforcing TLS communication. |
| Code automatic generation | Unsupported | Supported | Have development benefits depending on Code automatic generation |

It is described in the above description that the gateway module 110 uses the gRPC protocol when communicating with the external robot 103, but an embodiment of the present disclosure is not limited thereto. For example, the gateway module 110 may communicate with the external robot 103 or the external user device 105 using a different protocol including webRTC, Kafka, or mqtt.

According to an embodiment, when communicating between at least some of the at least one external robot 103, the external user device 105, or the respective modules included in the robot control device 101, the authentication processing module 115 may perform authentication processing procedures for the respective modules included in the robot control device 101 in an integrated manner. For example, when the MSA-based robot control device 101 performs an authentication processing procedure for each module (or service) depending on a request of the outside (e.g., the external robot 103 or the external user device 105), a data delay may occur and maintenance efficiency may be reduced depending on adding a function change and authentication procedure for each individual module. In this case, as the MSA-based robot control device 101 parses and compares payloads of an authentication token at the time for each module, the capacity of the token used for an authentication procedure may increase. According to an embodiment of the present disclosure, a procedure of identifying a payload again in each of other modules may be omitted for an authentication token value authenticated once as the authentication processing module 115 processes authentication procedures for the respective modules in common. Thus, as the integrated authentication processing is performed by the authentication processing module 115, a time and resources required for authentication may decrease and it may be easy to correct, add, and maintain the respective modules in the MSA.

According to an embodiment, the user management module 120 may include an individual user management module for using the at least one external robot 103, a group management module for managing a user group, a branch management module for managing a branch where a robot operates, and a database (DB) for storing pieces of management data.

According to an embodiment, the robot management module 130 may include a robot state management module, a per-area management module, a scheduling module, a metadata module, and a DB for storing pieces of related data. For example, the robot state management module may manage authentication data, a function, a name, and/or authority of the external robot 103. For example, the per-area management module may manage a branch of the external robot 103, a location of the external robot 103, an operation area of a robot, and/or the number of the external robots 103 which are operating. For example, the scheduling module may set and manage an operation time zone, a day of the week, or a date, depending on a type of the external robot 103. For example, the metadata module of the robot management module 130 may store and manage reference data associated with a robot (e.g., area coordinates of the robot, map information, or a reference value or a threshold associated with a robot function). According to an embodiment, the robot management module 130 may control an operation (or an action) of the external robot 103 based on a state of the external robot 103, per-area management information, scheduling information, and/or metadata. According to an embodiment, the DB of the robot management module 130 may store an abnormal state response rule. For example, the robot management module 130 may obtain information about an abnormal state associated with the robot recognized by the detection module 160. For example, the robot management module 130 may transmit a command to control at least one of an operation or a state of the external robot 103 to the external robot 103, based on the abnormal state response rule.

According to an embodiment, the infrastructure interworking module 140 may include a plurality of modules for managing interworking between at least one infrastructure and the external robot 103 and a DB for storing pieces of related data. For example, the infrastructure interworking module 140 may manage an interworking operation between a front door, a chatbot associated with the external robot 103, an elevator, media, or other infrastructures and the external robot 103.

According to an embodiment, the service module 150 may manage service-related information provided by the external robot 103. For example, a metadata module of the service module 150 may manage related information (e.g., a service type, destination information, or service menu information) for each service industry, which is provided by the external robot 103. For example, an operation information module may manage an operation time associated with a service, an order time, or service interworking information of the external robot 103. For example, an enterprise resource planning (EPR)/stock module may generate and manage an EPR and stock status associated with a service. The service module 150 may include a DB for storing pieces of data associated with the service.

According to an embodiment, the detection module 160 may include a detection engine, an alarm transmission module, and a DB. For example, the detection engine may receive raw data (e.g., an operation area of the external robot 103, a location of the external robot 103, a speed of the external robot 103, a temperature of the external robot 103, an altitude of the external robot 103, and/or state information of the external robot 103) from the external robot 103. For example, the detection engine may detect an abnormal state associated with a robot based on the raw data received from the external robot 103.

According to an embodiment, the detection engine may generate a map associated with the operation area of the external robot 103, based on sensor data received from the external robot 103. The detection engine may set the operation area of the external robot 103 based on the generated map. The detection engine may receive coordinate information indicating a location of the external robot 103 from the external robot 103 and may recognize that an abnormal state is generated, when detecting that the external robot 103 deviates from the operation area set based on the generated map based on the coordinate information. According to an embodiment, the detection engine may divide the map into a plurality of areas and may set the number of robots operable for each of the plurality of divided areas. When detecting that the number of robots which are operating in each of the plurality of areas is greater than a specified threshold, the detection engine may recognize that the abnormal state is generated.

For example, when the external robot 103 operates in the outside (e.g., a place which is not a building or a basement), the detection engine may detect a location of the external robot 103 and whether the external robot 103 deviates from the set area using general map information and global navigation satellite system (GNSS) (or global positioning system (GPS)) data received from the external robot 103. However, when the external robot 103 is indoors, it may be difficult to determine a location of the robot using GPS data. In this case, the detection engine may receive map information generated by the external robot 103 from the external robot 103 or may generate map information (e.g., a sensor map) based on the sensor data received from the external robot 103. The detection engine may set an area where the external robot 103 operates based on the map information and may detect an abnormal state for the operation area of the external robot 103 based on the set area.

For example, Table 2 below is an example of data where the detection module 160 detects an abnormal state of the external robot 103 for each area.

TABLE 2

| Area ID | Name | Coordinates of map area | Number of operable robots | Operation area | Map ID |
|---|---|---|---|---|---|
| 1 | Operation area on first floor | [[36.224, 9.694], [39.842, 9.481], [39.97, 8.374], [36.224, 8.544]] | 10 | TRUE | 23 |
| 2 | Waiting place on first floor | [[39.161, 13.567], [40.779, 13.61], [40.907, 10.46], [39.332, 10.587]] | 3 | TRUE | 23 |
| 3 | loading place on second floor | [[31.031, 12.56], [32.819, 12.482], [32.776, 9.63], [31.372, 9.374]] | 1 | TRUE | 34 |
| 4 | No-entry area on third floor | [[31.414, 12.59], [32.521, 12.464], [32.776, 9.399], [31.372, 9.867]] | 0 | FALSE | 45 |

The area ID indicates each area identification number of the map set by the detection module 160, the name indicates a name of each area, the map area coordinates indicate coordinate information of each area, the number of operable robots indicates a value obtained by setting the maximum number of operable external robots 103 in the corresponding area, the operation area has the "TRUE" value when it is a place capable of performing robot operation and has the "FALSE" value when it is a place where robot operation is prohibited, and the map ID indicates an identification number of a map corresponding to the corresponding area. For example, the detection module 160 may detect an abnormal state for each area of the robot based on data in Table 2 above. A description will be additionally given below of the abnormal state detected by the detection module 160 (e.g., the detection engine) with reference to FIG. 6.

According to an embodiment, the detection engine 160 (e.g., the detection engine) may receive a statistical report from the statistics module 170. The detection engine 160 (e.g., the detection engine) may update the abnormal state response rule based on the statistical report.

According to an embodiment, the alarm transmission module may generate an alarm indicating the detected abnormal state associated with the robot and may provide the generated alarm to the external robot 103 and/or the external user device 105. For example, the DB of the detection module 160 may store data received from the external robot 103, information (e.g., data associated with the abnormal state) detected by the detection engine, data associated with the notification, and/or the abnormal state response rule. For example, the abnormal state response rule may include a rule associated with whether to provide an alarm depending on at least one of a state of the robot, a location of the robot, a speed of the robot, or an environment around the robot and a response operation of the robot.

For example, Table 3 below indicates an example of the abnormal state response rule.

TABLE 3

| Detection item | Threshold | Countermeasures | Alarm or not |
|---|---|---|---|
| Excessive use of computing resources (CPU, MEMORY, Temperature) | 100%/1 minute | — | Manager alarm |
| HW/SW module state | ERROR | Emergency stop | Manager alarm/SMS |
| Occurrence of error in robot control code | ERROR | Emergency stop | Manager alarm/SMS |
| Deviation of robot from area | Deviate from coordinates of set area | Stop and then move to waiting place | Manager alarm/SMS |
| Excess of speed | 5 km/h | Command to decelerate | Manager alarm |
| Excess of driving distance | 10000 km | — | Manager alarm |
| Excess of inclination angle | 15 degrees | Stop and then move to waiting place | Manager alarm |
| Opening of cargo box/malfunction | FAIL/ERROR | Pause | Manager alarm/SMS/chatbot |

For example, the abnormal state response rule may include a comparison value (or a threshold), a response operation of the robot, and/or information about whether to provide an alarm and a type of the alarm for each type of the abnormal state as shown in Table 3 above. According to an embodiment, the abnormal state response rule is not limited to Table 3 above. Another item may be added or omitted from the abnormal state response rule, and a countermeasure for each item and whether there is an alarm may be changed in the abnormal state response rule. For example, the detection module 160 (e.g., the alarm transmission module) may determine a type of an alarm and whether to transmit an alarm based on the abnormal state response rule. According to an embodiment, the detection module 160 may transmit a request to transmit a command to perform a countermeasure to the external robot 103 to the robot management module 130 based on the abnormal state response rule.

According to an embodiment, the statistics module 170 may generate a statistical report including at least a portion of information about the number of times that the abnormal state is generated according to a component, an operation type, a movement speed, a surrounding environment, or a location of the external robot 103, based on the raw data received from the external robot 103 and data associated with the abnormal state associated with the external robot 103.

For example, Table 4 below represents an example of information about a type of an error generated by the external robot 103, an area ID, and the number of occurrences, which is included in the statistical report generated by the statistics module 170.

TABLE 4

| Type of error | Area ID | Number of occurrences |
|---|---|---|
| NAVI_MODULE | 1 | 5 |
| MOVE_FAIL | 1 | 1 |
| CPU_TEMP | 32 | 3 |
| MEM_USAGE | 33 | 4 |
| CODE_ERR | 4 | 5 |
| VISION_FAIL | 3 | 2 |
| CAMERA_ERR | 1 | 32 |

For example, NAVI_MODULE indicates an error of a navigation module of the external robot 103, MOVE_FAIL indicates an error where the external robot 103 fails in movement according to the path, CPU_TEMP indicates an error where a CPU temperature of the external robot 103 is greater than a threshold, MEM_USAGE indicates an error where a memory usage of the external robot 103 is greater than the threshold, CODE_ERR indicates an error where an error code of the module included in the external robot 103 is generated, VISION_FAIL indicates failure in recognition of the module included in the external robot 103, and CAMERA_ERR indicates an error where a camera of the external robot 103 malfunctions. The area ID indicates an identification number indicating the operation area of the external robot 103. According to an embodiment, types of the errors and pieces of information in Table 4 above are an example and are not limited thereto.

For example, Table 5 below represents an example of information about a speed of the external robot 103, an area ID, and the number of occurrences, which is included in the statistical report generated by the statistics module 170.

TABLE 5

| Robot speed(km/h) | Area ID | Number of occurrences |
|---|---|---|
| 0~1 | 1 | 32 |
| 1~2 | 1 | 142 |
| 2~3 | 32 | 72 |
| 3~4 | 33 | 14 |
| 4~5 | 4 | 5 |
| 5~6 | 3 | 16 |
| More than 6 | 1 | 32 |

According to an embodiment, error information according to the robot speed in Table 5 above is an example and is not limited thereto.

For example, the statistics module 170 may generate a statistical report based on various robot-related parameters. For example, the statistics module 170 may include the number of times that the abnormal state is generated for each type of the module (e.g., a camera, navigation, a TTS engine, a task manager (TM) module, and/or a client agent module) included in the external robot 103 in the statistical report, may include the number of times that the abnormal state is generated for each operation type (e.g., movement, stop, robot arm control, or door opening and closing) of the external robot 103 in the statistical report, and may include the number of times that the abnormal state is generated for each speed, the number of times that the abnormal state is generated for each gradient, the number of times that the abnormal state is generated for each area, or the number of times that the abnormal state is generated for each altitude in the statistical report.

For example, the statistics module 170 may provide the statistical report to at least one of the detection module 160, the external robot 103, or the external user device 105.

According to an embodiment, the statistics module 170 may generate a plurality of statistical reports according to a specified duration. For example, the statistics module 170 may generate a daily report, a weekly report, and a monthly report associated with operation of the external robot 103.

According to an embodiment, the workflow module 180 may include a DB for storing scenario data, a scenario list, a scenario engine, and pieces of related data. For example, the scenario may indicate flow of an operation for each situation where the external robot 103 provides a specific service. For example, the scenario data may include information of data necessary for the external robot 103 to perform the specific scenario. For example, the scenario list may include a plurality of scenarios set to correspond to the specific situation. For example, the scenario engine may drive the external robot 103 such that the external robot 103 operates depending on the set scenario. For example, the scenario engine may provide the external robot 103 with the scenario (and/or a command to perform an operation corresponding to the scenario).

According to an embodiment, the log module 190 may store the raw data received from the external robot 103 and the data associated with the abnormal state detected by the detection module 160. According to an embodiment, the log module 190 may index the raw data and the data associated with the abnormal state and may determine a storage duration for the indexed raw data and data associated with the abnormal state based on a specified storage policy. According to an embodiment, the log module 190 may include an event log module for managing a log associated with a specific event which occurs in the external robot 103, a communication log module for managing a communication-related log of the external robot 103, a robot state log module for managing a log associated with a state of the external robot 103, and a DB for storing log data associated with various robots.

According to an embodiment, at least some of the respective modules of the robot control device 101 shown in FIG. 1 may be implemented as an independent server device. For example, the robot control device 101 may be implemented as an integrated server (or system) including a plurality of independent servers. In this case, the respective individual server devices may include a communication circuit, a memory (e.g., a database), and/or a processor, and the operations described above may be performed by a processor of the server device.

According to an embodiment, the configuration of the robot control device 101 is not limited to those shown in FIG. 1. At least some modules (or services) may be omitted or at least one new module (or service) may be added. For example, the robot control device 101 may further include a content management module for managing content in the robot and an image relay module for relaying and storing a transmission image of the robot.

Figure 2:
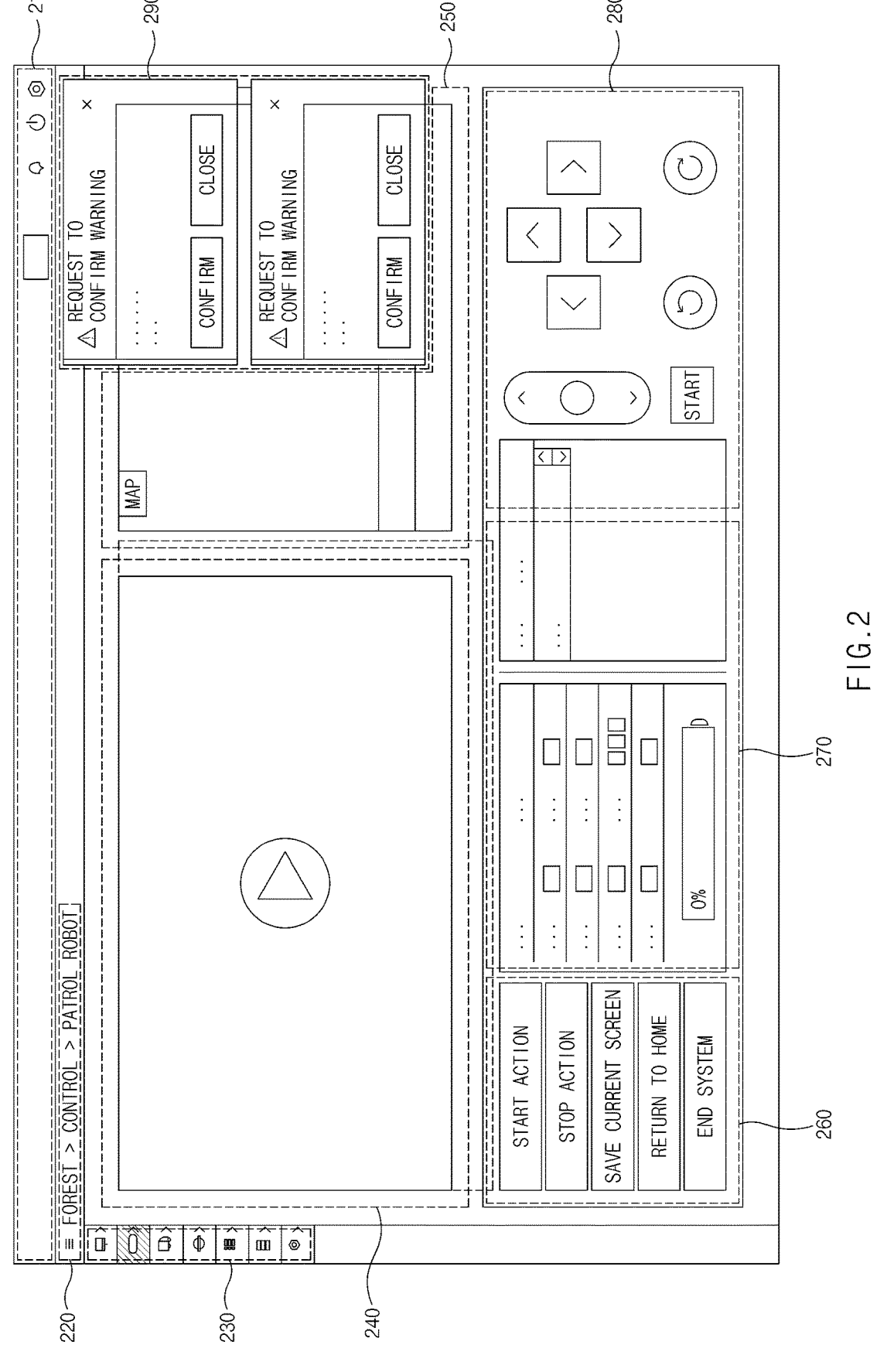
FIG. 2 is a drawing for describing an operation of a robot control device according to an embodiment of the present disclosure.

FIG. 2 is a drawing for describing an operation of a robot control device according to an embodiment of the present disclosure. For example, FIG. 2 illustrates an example of a robot management user interface (UI) 200 provided by a robot control device or a manager device.

The robot management UI 200 may include a status bar area 210, a robot information area 220, a function icon area 230, an image display area 240, a zone display area 250, a robot control area 260, a robot state display area 270, and a manual control area 280. For example, the robot management UI 200 may provide pieces of information associated with at least one robot which is operating in the form of a dashboard.

According to an embodiment, the status bar area 210 may include a current time, manager information, an icon for displaying a notification 290, a power button, and a setting button. For example, when a user (e.g., a manager) selects the icon for displaying the notification 290, the robot management UI 200 may display the received list of the notification 290.

The power button may be a button for ending the robot management UI 200. The setting button may be a button for controlling a layout, an item, and/or various settings of the robot management UI 200.

According to an embodiment, the robot information area 220 may display information of a target robot which is currently being managed.

According to an embodiment, the function icon area 230 may include at least one function button for controlling the target robot.

According to an embodiment, the image display area 240 may display image data received from the target robot. For example, the image display area 240 may display an operation image and/or a surrounding image captured by the target robot. According to an embodiment, the zone display area 250 may display a map of a zone where the target robot is providing a service. For example, the map may include map information received from an external device and may include map information (e.g., a sensor map) generated by means of a sensor by the target robot.

According to an embodiment, the robot control area 260 may include buttons for starting/stopping an operation of a robot, storing a current screen, controlling the target robot to return to a reference location (e.g., home), or ending a control system.

According to an embodiment, the robot state display area 270 may display states of hardware modules included in the target robot, states of software modules, a battery state, and/or log data associated with the target robot.

According to an embodiment, the manual control area 280 may include control buttons for manually controlling the target robot, According to an embodiment, when detecting an abnormal state associated with at least one external robot, the robot control device may provide the notification 290 associated with the abnormal state through the robot management UI 200. For example, the notification 290 may be output in the form of a pop-up window. The robot control device may provide the notification 290 associated with the abnormal state to the external user device (e.g., the manager device) and/or the external robot in the form of an SMS, a chatbot, an SNS, and/or a message other than the robot management UI 200.

According to various embodiments, the robot management UI 200 is not limited to those shown in FIG. 2, and the areas, the function, and/or the layout included in the robot management UI 200 may be changed.

Figure 3:
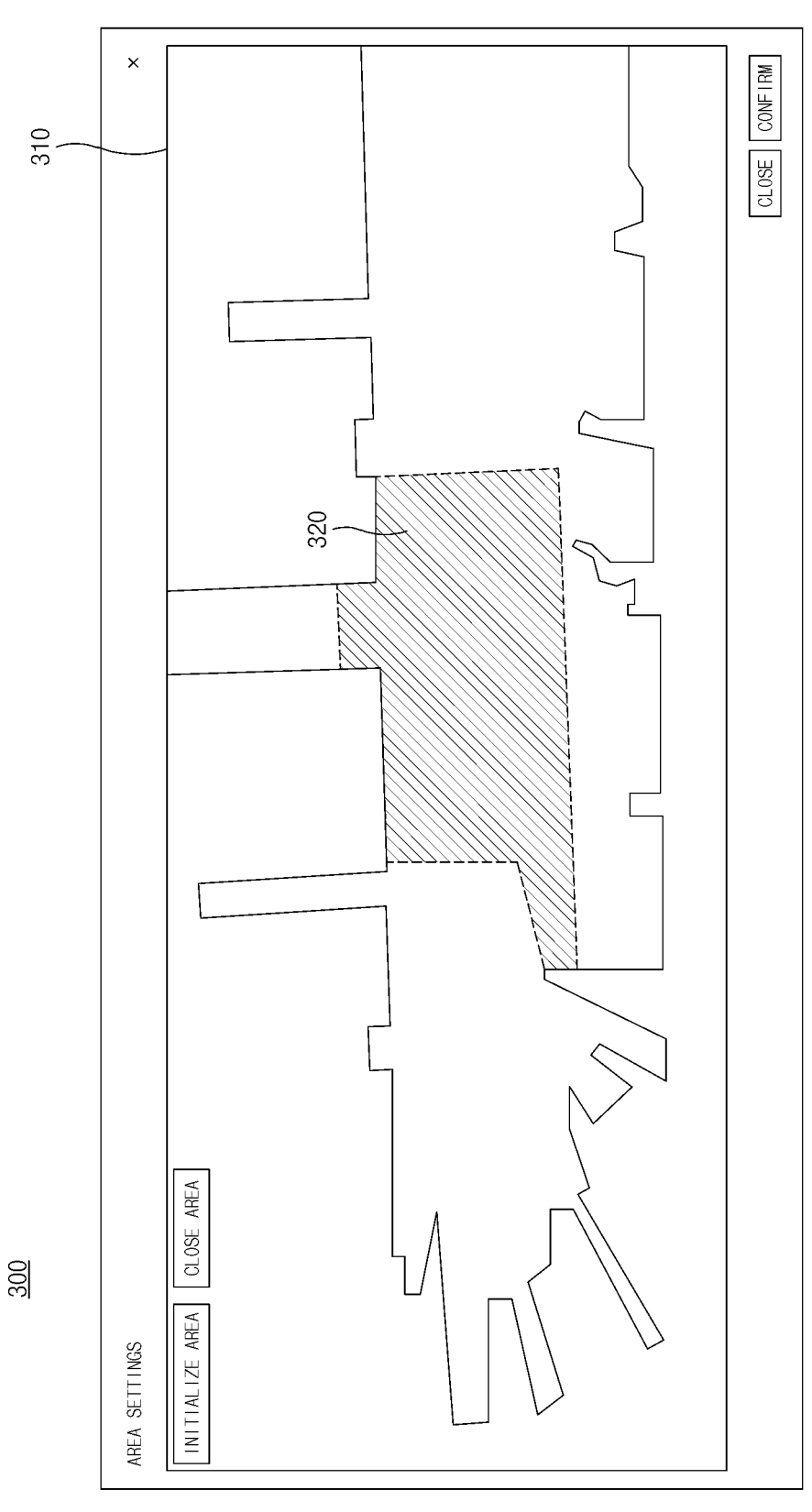
FIG. 3 is a drawing for describing an operation of a robot control device according to an embodiment of the present disclosure.

FIG. 3 is a drawing for describing an operation of a robot control device according to an embodiment of the present disclosure. For example, FIG. 3 illustrates an example of an area setting user interface (UI) 300 for controlling map information of a place where a robot is operating and area setting information.

According to an embodiment, the robot control device may obtain map information 310 of the place where the robot is operating. For example, the robot control device may obtain a map generated by an external robot from the external robot. For example, the robot may generate a map (e.g., a sensor map) of a place where a service is being provided using a sensor. For example, the robot control device may generate a map of the place where the robot is operating using sensor data received from the external robot. The robot control device may obtain the map information 310 from an external device (e.g., another server device, a user device, and/or a manager device).

According to an embodiment, the robot control device may provide a user (e.g., a manager) with the map information 310 of the place where the robot is operating through the area setting UI 300. The robot control device may set an area 320 to operate a robot based on the map information 310 depending on an input of the user. For example, when setting the area 320 to operate the robot, the robot control device may determine that an abnormal state of the robot is generated when the robot deviates from a set area 320. According to an embodiment, when controlling a plurality of robots, the robot control device may limit the number of robots operable in the set area 320 within a specified number. For example, when the robots which are greater than the specified number are operating within the set area 320, the robot control device may determine that the abnormal state is generated.

FIG. 4 is a drawing for describing an operation of a robot control device according to an embodiment of the present disclosure. For example, FIG. 4 illustrates an example of a statistical report 400 generated by a robot control device. For example, the statistical report 400 may include various pieces of information associated with a robot in the form of a dashboard.

According to an embodiment, the statistical report 400 may include service summary information 410 associated with a robot, error information 420, service history information 430, robot operation information 440, and service details 450. For example, the service summary information 410 may include information about a required time associated with a service (e.g., delivery) provided by a robot, the number of times that the service is provided, the number of times that an error (or an abnormal state) is generated, and/or the number of times that an obstacle (e.g., a person) is detected.

For example, the error information 420 may include information about types of errors which occur while the robot is providing a service, the number of occurrences for each type, and importance (or percentage) for each type. For example, errors which occur in the robot may be listed and displayed in order according to the number of occurrences and/or importance in the error information 420.

For example, the service history information 430 may include a history of a service provided by the robot and statistical data (e.g., a graph) associated with the service history.

For example, the robot operation information 440 may include the number of times that an operation associated with a specific function (e.g., text-to-speech (TTS)) of the robot is performed and a ranking associated with the specific function, information about a place where the service is provided and the number of times that the service is provided, and statistical data indicating it.

For example, the service details 450 may include details of histories associated with providing the service and related statistical data.

According to an embodiment, the information included in the statistical report 400 and the display scheme (or the layout) are not limited to FIG. 4, and at least some thereof may be changed.

Figure 5:
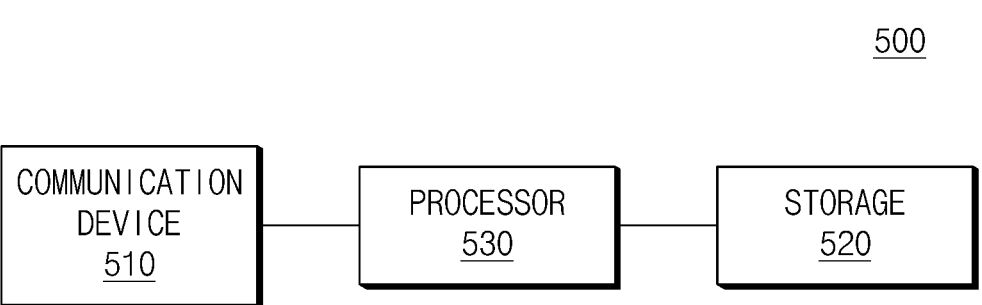
FIG. 5 is a block diagram of a robot control device according to an embodiment of the present disclosure.

FIG. 5 is a block diagram of a robot control device according to an embodiment of the present disclosure.

According to an embodiment, a robot control device 500 may include a communication device 510, storage 520, and a processor 530.

According to an embodiment, the communication device 510 may include a communication circuit for transmitting and receiving data with an external device (e.g., an external server, an external robot, and/or an external user device (e.g., a manager device)). According an to embodiment, the communication device 510 may communicate with the external device using a plurality of communication schemes (or communication protocols). For example, the communication device 510 may communicate with the external robot using a gRPC protocol and may communicate with the external user device using a REST API protocol.

According to an embodiment, the communication device 510 may include at least one of a mobile communication module, a wireless Internet module, a short-range communication module. The mobile communication module may communicate with an external autonomous ground vehicle, an external control server, and/or an external manager over a mobile communication network established according to technical standards for mobile communication or a communication scheme (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), or the like).

The wireless Internet module may be a module for wireless Internet access, which may communicate with the external device through wireless LAN (WLAN), wireless-fidelity (Wi-Fi), Wi-Fi Direct, digital living network alliance (DLNA), wireless broadband (WiBro), interoperability world for microwave access (WiMAX), high speed downlink packet access (HSDPA), high speed uplink packet access (HSUPA), long term evolution (LTE), long term evolution-advanced (LTE-A), or the like.

According to an embodiment, the storage 520 may store raw data received from the external robot and/or data associated with an abnormal state. The storage 520 may store information and/or data (e.g., statistical data) associated with an operation of the robot control device 500. The storage 520 may store an abnormal state response rule. For example, the abnormal state response rule may include a rule associated with whether to provide an alarm depending on at least one of a state of a robot, a location of the robot, a speed of the robot, or an environment around the robot and a response operation of the robot.

According to an embodiment, the storage 520 may store instructions executed by the processor 530. The storage 520 may include at least one of at least one of storage media such as a flash memory, a hard disk, a solid state disk (SSD), a secure digital (SD) card, an embedded multimedia card (eMMC), universal flash storage (UFS), a removable disk, and/or web storage or storage media such as a random access memory (RAM), a static RAM (SRAM), a read only memory (ROM), a programmable ROM (PROM), an electrically erasable and programmable ROM (EEPROM), and/or an erasable and programmable ROM (EPROM).

According to an embodiment, the processor 530 may receive raw data from at least one external robot through the communication device 510. For example, the raw data may include sensor data obtained by the at least one external robot, operation data of the robot, state information of the robot, setting information of the robot, and/or service-related information provided by the robot. According to an embodiment, the processor 530 may communicate with the at least one external robot using the gRPC protocol. According to an embodiment, the processor 530 may receive raw data associated with the at least one external robot through another external device (e.g., an external user device (e.g., a user terminal, a PC, an application, and/or a manager device associated with the external robot) or an external server) except for the at least one external robot. According to an embodiment, the processor 530 may communicate with the other external device using the REST API protocol.

According to an embodiment, the processor 530 may recognize an abnormal state generated in the at least one external robot based on the raw data. For example, the abnormal state may include an operation error in the external robot, deviation from a set area, a malfunction of a module included in the external robot, excessive CPU or memory usage, an error code generated by the robot, an error in driving speed, excess of a set driving distance, excess of an inclination angle, and/or a malfunction of a device (e.g., a cargo box) included in the robot.

According to an embodiment, the processor 530 may generate a map (e.g., a sensor map) associated with an operation area of the at least one external robot, based on the sensor data received from the at least one external robot. The processor 530 may set the operation area of the at least one external robot based on the map. The processor 530 may receive coordinate information indicating a location of the at least one external robot from the at least one external robot. For example, the coordinate information may be information indicating a location of the external robot based on the generated map. When detecting that the at least one external robot deviates from the set operation area based on the coordinate information, the processor 530 may recognize that the abnormal state associated with the robot is generated. According to an embodiment, the processor 530 may divide the map into a plurality of areas and may set the number of robots operable for each of the plurality of divided areas. When detecting that the number of robots which are operating in each of the plurality of areas is greater than a specified threshold, the processor 530 may recognize that the abnormal state is generated.

According to an embodiment, the abnormal state is not limited to those listed above, and the occurrence of an unintended state or situation in conjunction with the operation of the external robot may be included in the abnormal state.

According to an embodiment, the processor 530 may provide the external user device with a notification associated with the abnormal state based on the predetermined abnormal state response rule stored in the storage 520. For example, the abnormal state response rule may include information obtained by mapping whether to provide an alarm corresponding to the abnormal state of the robot with a response operation of the robot.

According to an embodiment, the processor 530 may transmit a command to control at least one of an operation or a state of the at least one external robot to the at least one external robot based on the abnormal state response rule. For example, the processor 530 may transmit a command to make an emergency stop, move to a waiting place, pause, and/or move to a predetermined return place to the at least one external robot based on the abnormal state response rule. According to an embodiment, the operation commands transmitted to the external robot are not limited to those described above.

According to an embodiment, the processor 530 may store raw data and data associated with the abnormal state of the at least one external robot in the storage 520.

According to an embodiment, the processor 530 may index the raw data and the data associated with the abnormal state. The processor 530 may determine a storage duration for the indexed raw data and data associated with the abnormal state based on a specified storage policy. The storage policy may include a criterion for determining a storage duration of data based on a type of the data, a type of the abnormal state, the number of times that the abnormal state is generated, a type of a service provided by a robot, and/or a location where the robot provides the service.

According to an embodiment, the processor 530 may receive a request of data conforming to a specified condition between the raw data or the data associated with the abnormal state from the at least one external robot or the external user device. For example, the data requested by the at least one external robot or the external user device may include statistical data. According to an embodiment, the processor 530 may provide the at least one external robot or the external user device with the data conforming to the specified condition, in response to the request.

According to an embodiment, the processor 530 may generate a statistical report including information about the number of times that the abnormal state is generated according to a component, an operation type, a movement speed, a surrounding environment (e.g., a temperature, a slope, or an altitude) of the at least one external robot, based on the raw data and the data associated with the abnormal state. For example, the statistical report may include statistical data associated with the abnormal state generated in the at least one external robot. For example, the processor 530 may generate a statistical report for each specified duration (e.g., a daily statistical report, a weekly statistical report, a monthly statistical report, and an annual statistical report).

According to an embodiment, the processor 530 may provide the statistical report to at least one of the at least one external robot or the external user device (e.g., a user terminal, a PC, an application, and/or a manager device associated with the external robot).

According to an embodiment, the processor 530 may update the abnormal state response rule based on the statistical report.

According to an embodiment, the processor 530 may perform at least some of operations performed by a gateway module 110, an authentication processing module 115, a user management module 120, a robot management module 130, an infrastructure interworking module 140, a service module 150, a detection module 160, a statistics module 170, a workflow module 180, and a log module 190 of FIG. 1. For example, at least some of the gateway module 110, the authentication processing module 115, the user management module 120, the robot management module 130, the infrastructure interworking module 140, the service module 150, the detection module 160, the statistics module 170, the workflow module 180, and the log module 190 may be implemented as the processor 530.

Figure 6:
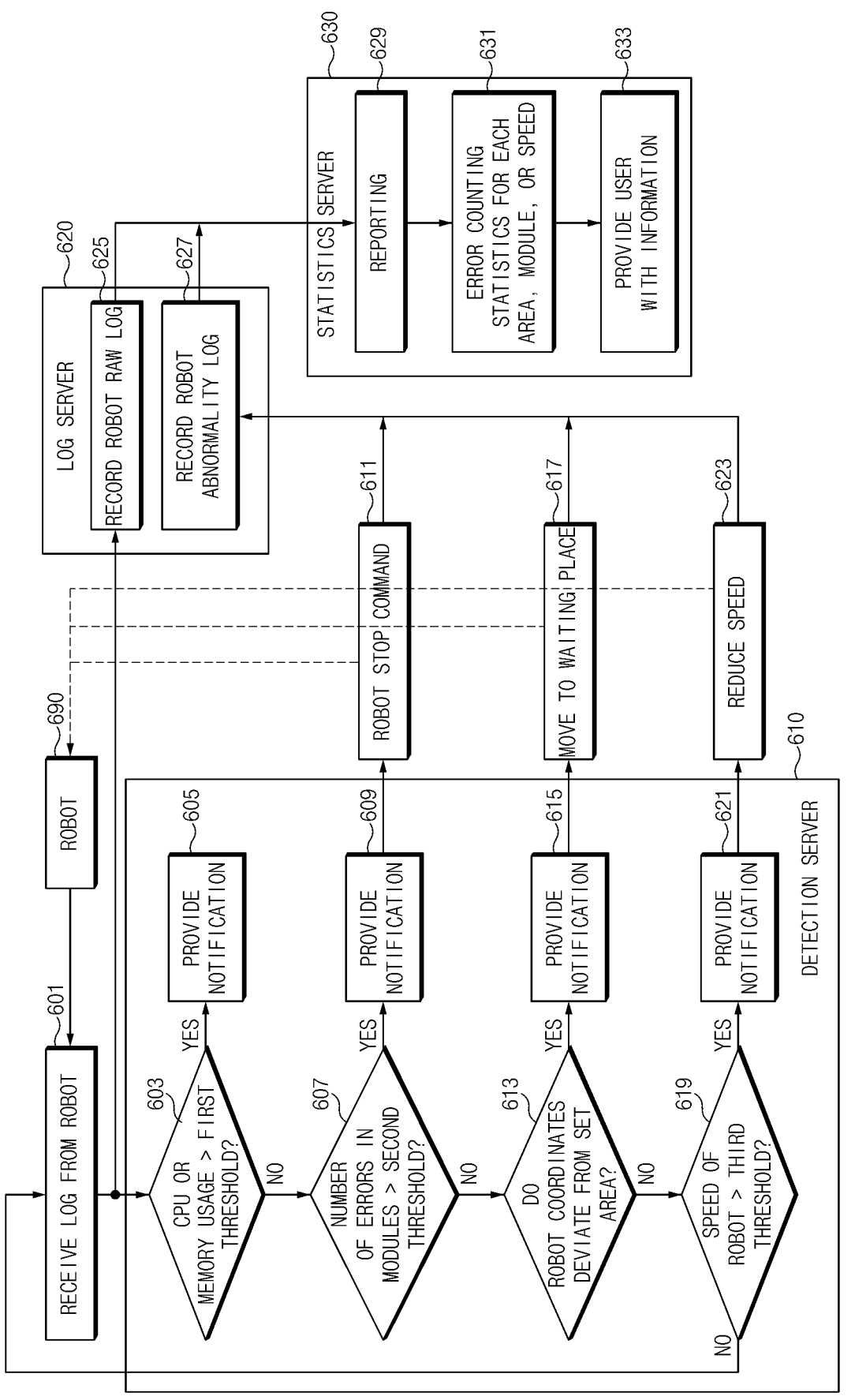
FIG. 6 is a drawing for describing a robot management operation of a robot control device according to an embodiment of the present disclosure.

FIG. 6 is a drawing for describing a robot management operation of a robot control device according to an embodiment of the present disclosure. According to an embodiment, the robot control device may include a plurality of servers (e.g., at least some of respective modules shown in FIG. 1).

According to an embodiment, in operation 601, the robot control device may receive log data from an external robot 690. For example, the log data may include raw data received from the external robot 690 and data associated with an abnormal state. For example, the raw data may include data obtained while the external robot 690 operates (e.g., data sensed by a sensor, data associated with a location of a robot, data associated with a service provided by the robot, data associated with a robot state, and/or data associated with an operation (or action) performed by the robot). For example, the data associated with the abnormal state may include data associated with an abnormality in a hardware module of at least one module, an abnormality in a software module of the at least one robot, and/or an abnormality in an operation of the robot. According to an embodiment, the log data may include data associated with the robot, which is received from another device (e.g., an external user device, an external manager device, or an external server) except for the at least one external robot 690.

According to an embodiment, operation 601 may be understood as being performed by a gateway module 110 of the robot control device.

According to an embodiment, in operation 603, the robot control device may determine whether a CPU or memory usage of the external robot 690 is greater than a first threshold based on the received log data. According to an embodiment, the robot control device may set and/or change the first threshold.

According to an embodiment, the robot control device may perform operation 605 when the CPU or memory usage is greater than the first threshold and may perform operation 607 when the CPU or memory usage is less than or equal to the first threshold.

According to an embodiment, in operation 605, the robot control device may provide a notification indicating that an abnormal state is generated to an external device (e.g., the external robot 690 or an external user device (e.g., a user terminal, a user application, or a manager device)). For example, the robot control device may provide the external device with a notification indicating that the CPU or memory usage of the robot is greater than the first threshold.

According to an embodiment, in operation 607, the robot control device may determine whether the number of errors in modules included in the external robot 690 is greater than a second threshold based on the received log data. For example, the modules included in the external robot 690 may include a hardware module and a software module. For example, the robot control device may compare the number of modules which do not normally operate among the modules of the external robot 690 with the second threshold. According to an embodiment, the robot control device may set and/or change the second threshold. According to an embodiment, the robot control device may perform operation 609 when the number of the errors in the modules is greater than the second threshold and may perform operation 613 when the number of the errors in the modules is less than or equal to the second threshold.

According to an embodiment, in operation 609, the robot control device may provide a notification indicating that the abnormal state is generated to the external device (e.g., the external robot 690 or the external user device (e.g., the user terminal, the user application, or the manager device)). For example, the robot control device may provide the external device with a notification indicating that the modules included in the robot do not normally operate.

According to an embodiment, in operation 611, the robot control device may transmit a robot stop command to the external robot 690. For example, the robot stop command may include a command to stop an operation which is being performed by the external robot 690. For example, the robot stop command may include a command to return to a predetermined return place after the external robot 690 stops its operation.

According to an embodiment, in operation 613, the robot control device may determine whether coordinates of the external robot 690 deviate from a set area based on the received log data. For example, the coordinates of the external robot 690 may include location information obtained through a GPS by the external robot 690 or coordinate information in a predetermined map measured using a sensor by the external robot 690. For example, the robot control device may set an area where the external robot 690 operates in the predetermined map. The robot control device may perform operation 615 when the external robot 690 deviates from the set area and may perform operation 619 when the external robot 690 is present within the set area.

According to an embodiment, in operation 615, the robot control device may provide the notification indicating that the abnormal state is generated to the external device (e.g., the external robot 690 or the external user device (e.g., the user terminal, the user application, or the manager device)). For example, the robot control device may provide the external device with a notification indicating that the external robot 690 deviates from the set area.

According to an embodiment, in operation 617, the robot control device may transmit a command to move to a waiting place to the external robot 690. For example, the robot control device may determine the waiting place in the set area.

According to an embodiment, in operation 619, the robot control device may determine whether a speed of the external robot 690 is greater than a third threshold based on the received log data. According to an embodiment, the robot control device may set or change the third threshold. According to an embodiment, the robot control device may perform operation 621 when the speed of the external robot 690 is greater than the third threshold and may receive a log in operation 601 when the speed of the external robot 690 is less than or equal to the third threshold.

According to an embodiment, in operation 621, the robot control device may provide the notification indicating that the abnormal state is generated to the external device (e.g., the external robot 690 or the external user device (e.g., the user terminal, the user application, or the manager device)). For example, the robot control device may provide a notification indicating that the speed of the robot is greater than the third threshold.

According to an embodiment, operations 603, 605, 607, 609, 613, 615, 619, and 621 may be understood as being performed by a detection server 610 (e.g., a detection module 160) of the robot control device.

According to an embodiment, in operation 623, the robot control device may transmit a command to reduce a speed to the external robot 690.

According to an embodiment, operations 611, 615, and 623 may be understood as being performed by a robot management module 130 and/or a workflow module 180 of the robot control device.

According to an embodiment, in operation 625, the robot control device may record a robot raw log. For example, the robot raw log may include log data obtained from the external robot 690 in a state where the abnormal state of the external robot 690 is not detected. For example, the robot raw log may include information about an operation performed by the external robot 690 in a normal state, a location of the external robot 690, a service provided by the external robot 690, and/or a module state of the external robot 690.

According to an embodiment, in operation 627, the robot control device may record a robot abnormality log. For example, the robot abnormality log may include log data obtained from the external robot 690 when the abnormal state associated with the external robot 690 is detected. For example, the robot abnormality log may include log data received from the external robot 690 when the abnormal state is detected in operations 603, 607, 613, or 619 and data for the result of detecting and processing the abnormal state.

According to an embodiment, operations 625 and 627 may be understood as being performed by a log server 620 (e.g., a log module 190) of the robot control device.

According to an embodiment, in operation 629, the robot control device may perform reporting based on the robot raw log and the robot abnormality log. For example, the robot control device may generate statistical data associated with operation of the external robot 690 based on the robot raw log and the robot abnormality log.

According to an embodiment, in operation 631, the robot control device may generate statistical data associated with an error in the external robot 690. For example, the robot control device may count an error (or an abnormal state) for each area, module, or speed of the external robot 690 and may generate statistical data associated with the error based on it.

According to an embodiment, in operation 633, the robot control device may provide a user device (e.g., a terminal of a robot user, an application of the robot user, and/or a manager device) with the data generated in operation 629 and/or operation 631. According to an embodiment, the robot control device may provide data to the user device through the gateway module 110.

According to an embodiment, operations 629, 631, and 633 may be understood as being performed by a statistics server 630 (e.g., a statistics module 170) of the robot control device.

According to an embodiment, at least some of the operations described with reference to FIG. 6 may be performed at the same time or an order of the at least some of the operations may be changed. For example, an order of operations 603, 607, 613, and 619, which branch, may be changed, and at least some operations may be performed at the same time.

Figure 7:
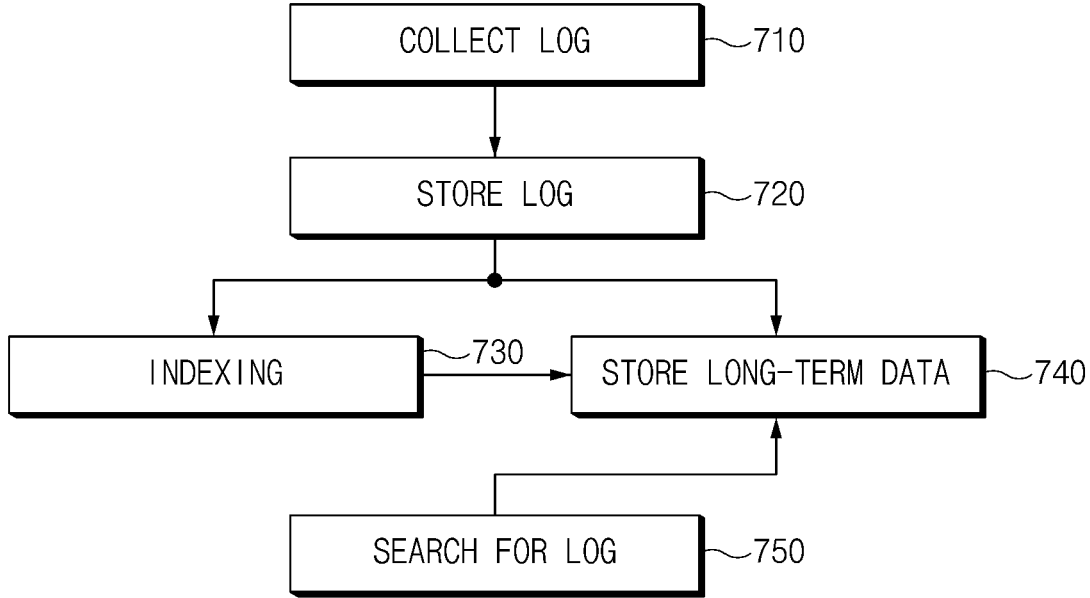
FIG. 7 is a drawing for describing a robot management operation of a robot control device according to an embodiment of the present disclosure.

FIG. 7 is a drawing for describing a robot management operation of a robot control device according to an embodiment of the present disclosure. For example, operations of FIG. 7 may be understood as being performed by a log module 190 of a robot control device 101 of FIG. 1.

According to an embodiment, in operation 710, the robot control device may collect a log. For example, the log may include raw data received from at least one external robot and data associated with an abnormal state. For example, the raw data may include data obtained while the at least one external robot operates (e.g., data sensed by a sensor, data associated with a service provided by the robot, data associated with a robot state, and/or data associated with an operation (or action) performed by the robot). For example, the data associated with the abnormal state may include data associated with an abnormality in a hardware module of at least one module, an abnormality in a software module of the at least one robot, and/or an abnormality in an operation of the robot. According to an embodiment, the log may include data associated with the robot, which is received from another device (e.g., an external user device, an external manager device, or an external server) except for the at least one external robot.

According to an embodiment, in operation 720, the robot control device may store the log.

According to an embodiment, in operation 730, the robot control device may index the log. For example, the robot control device may generate an index for the log collected in real time or on a periodic basis depending on a specified period. For example, the index may be used to search for a specific log in the future by the external robot or the external user device (e.g., the manager device).

According to an embodiment, in operation 740, the robot control device may store long-term data. According to an embodiment, the robot control device may determine a storage duration for the indexed raw data and data associated with the abnormal state based on a specified storage policy. For example, the specified storage policy may include information about types of the raw data and the data associated with the abnormal state, a priority for each type, and a priority for each number of occurrences. For example, the robot control device may delete data where the determined storage duration elapses.

According to an embodiment, in operation 750, the robot control device may search for a log depending on a request of the external robot or the external user device. For example, the robot control device may recognize an index corresponding to the received request and may search for a log corresponding to the index. The robot control device may provide the found log to the external robot or the external user device.

Figure 8:
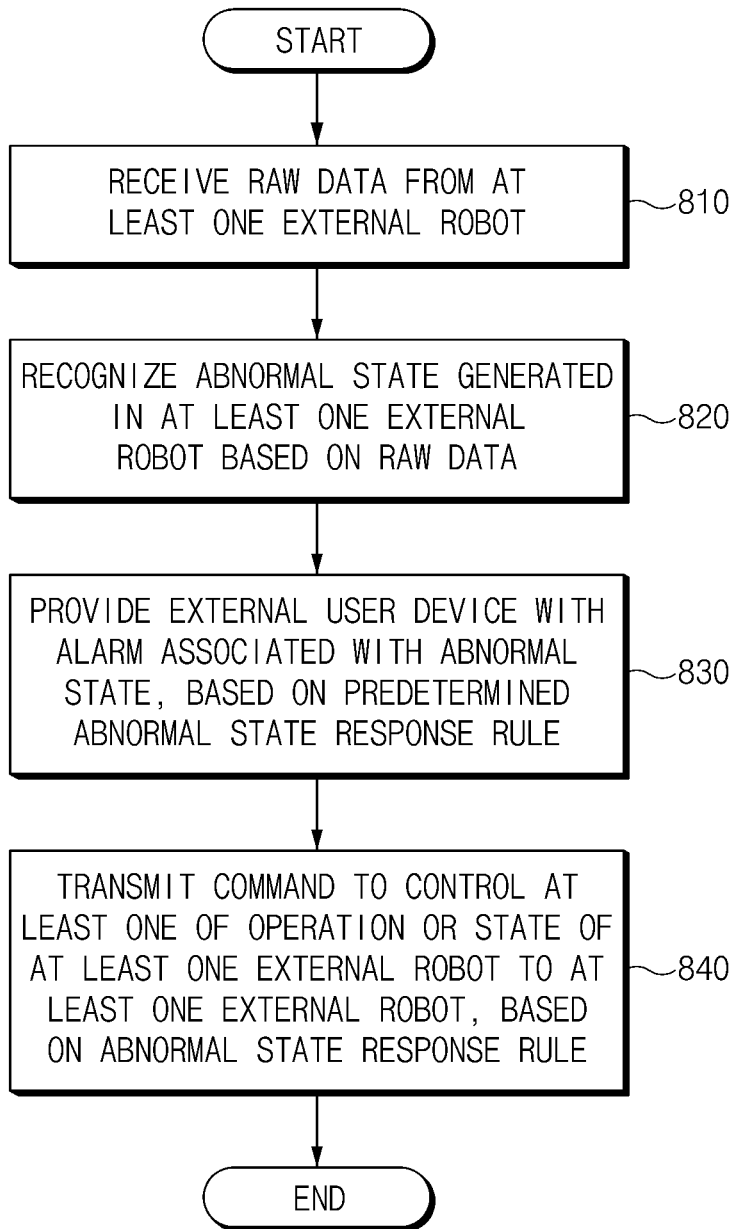
FIG. 8 is a flowchart of a robot management method of a robot control device according to an embodiment of the present disclosure.
Figure 9:
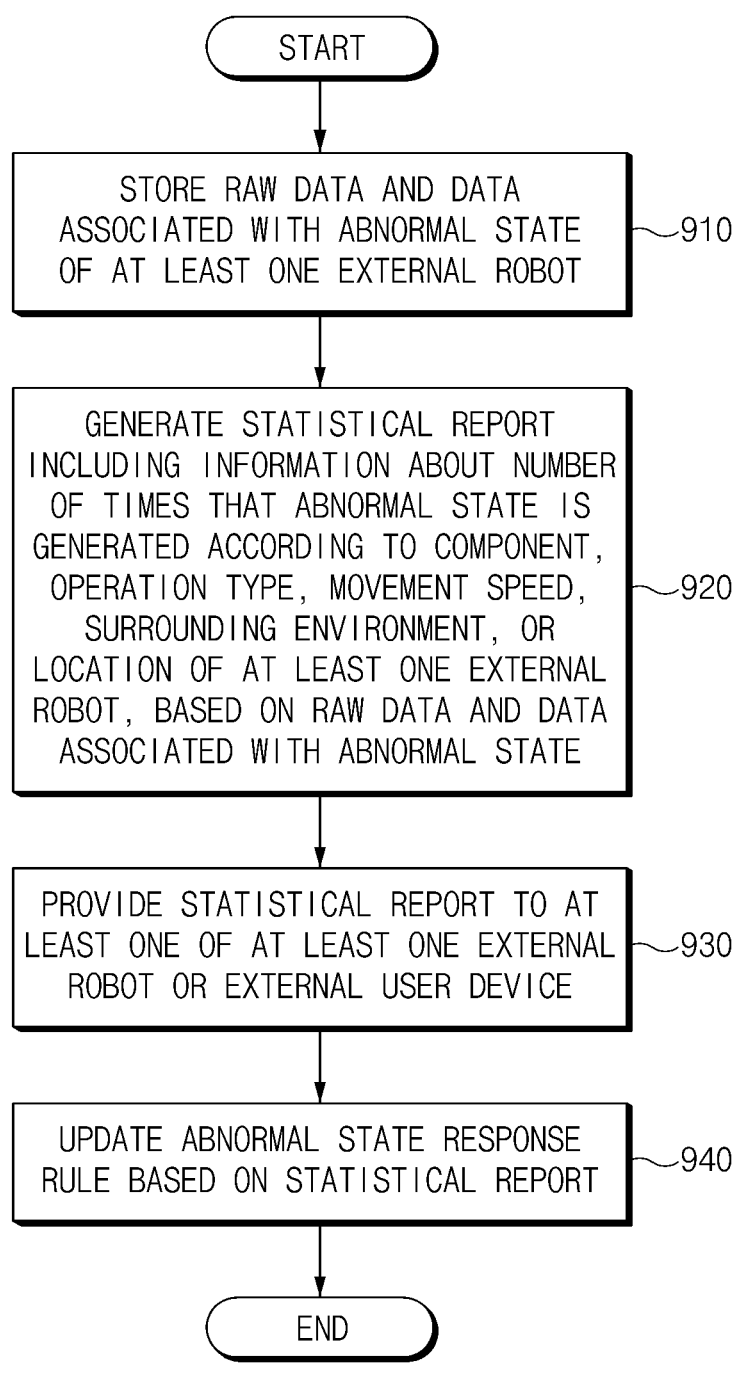
FIG. 9 is a flowchart of a robot management method of a robot control device according to an embodiment of the present disclosure.

According to various embodiments, a scenario corresponding to the abnormal state of the robot is not limited to FIG. 7 and another response scenario as well as a response scenario according to a CPU or memory usage, the number of module errors, whether robot coordinates deviate from a set area, or a robot speed may be added. For example, the robot control device may control to provide an alarm and increase a robot speed when the speed of the robot is less than or equal to a set fourth threshold, may provide a notification depending on an operation altitude of the robot, a temperature of an operation area, whether an obstacle is detected, or whether an impact (or collision) occurs, or may control a corresponding operation of the robot Hereinafter, a description will be given in detail of a robot management method according to another embodiment of the present disclosure with reference to FIGS. 8 and 9. FIGS. 8 and 9 are flowcharts illustrating a robot management method according to another embodiment of the present disclosure.

Hereinafter, it is assumed that a robot control device 101 of FIG. 1 or a robot control device 500 of FIG. 5 performs a process of FIGS. 8 and 9. Furthermore, in a description of FIGS. 8 and 9, an operation described as being performed by a robot control device may be understood as being controlled by respective modules of the robot control device 101 or a processor 530 of a robot control device 500.

FIG. 8 is a flowchart of a robot management method of a robot control device according to an embodiment of the present disclosure.

According to an embodiment, in operation 810, the robot control device may receive raw data from at least one external robot. For example, the raw data may include sensor data obtained by the at least one external robot, operation data of the robot, state information of the robot, setting information of the robot, and/or service-related information provided by the robot. According to an embodiment, the robot control device may communicate with the at least one external robot using a gRPC protocol. According to an embodiment, the robot control device may receive raw data associated with the at least one external robot through another external device (e.g., an external user device (e.g., a user terminal, PC, an a application, and/or a manager device associated with the external robot) or an external server) except for the at least one external robot. According to an embodiment, the robot control device may communicate with the other external device using a REST API protocol.

According to an embodiment, in operation 820, the robot control device may recognize an abnormal state generated in the at least one external robot based on the raw data. For example, the abnormal state may include an operation error in the external robot, deviation from a set area, a malfunction of a module included in the external robot, an excessive CPU or memory usage, an error code generated by the robot, an error in driving speed, excess of a set driving distance, excess of an inclination angle, and/or a malfunction of a device (e.g., a cargo box) included in the robot.

According to an embodiment, the robot control device may generate a map (e.g., a sensor map) associated with an operation area of the at least one external robot, based on sensor data received from the at least one external robot. The robot control device may set the operation area of the at least one external robot based on the map. The robot control device may receive coordinate information indicating a location of the at least one external robot from the at least one external robot. For example, the coordinate information may be information indicating a location of the external robot based on the generated map. When detecting that the at least one external robot deviates from the set operation area based on the coordinate information, the robot control device may recognize that the abnormal state associated with the robot is generated. According to an embodiment, the robot control device may divide the map into a plurality of areas and may set the number of robots operable for each of the plurality of divided areas. When detecting that the number of robots which are operating in each of the plurality of areas is greater than a specified threshold, the robot control device may recognize that the abnormal state is generated.

According to an embodiment, the abnormal state is not limited to those listed above, and the occurrence of an unintended state or situation in conjunction with the operation of the external robot may be included in the abnormal state.

According to an embodiment, in operation 830, the robot control device may provide the external user device with a notification associated with the abnormal state based on a predetermined abnormal state response rule. For example, the robot control device may include the predetermined abnormal state response rule. For example, the abnormal state response rule may include a rule associated with whether to provide an alarm depending on at least one of a state of a robot, a location of the robot, a speed of the robot, or an environment around the robot and a response operation of the robot. For example, the abnormal state response rule may include information obtained by mapping whether to provide an alarm corresponding to the abnormal state of the robot with a response operation of the robot.

According to an embodiment, in operation 840, the robot control device may transmit a command to control at least one of an operation or a state of the at least one external robot to the at least one external robot based on the abnormal state response rule. For example, the robot control device may transmit a command to make an emergency stop, move to a waiting place, pause, and/or move to a predetermined return place to the at least one external robot based on the abnormal state response rule. According to an embodiment, the operation commands transmitted to the external robot are not limited to those described above.

FIG. 9 is a flowchart of a robot management method of a robot control device according to an embodiment of the present disclosure.

According to an embodiment, in operation 910, the robot control device may store raw data and data associated with an abnormal state of at least one external robot.

According to an embodiment, in operation 920, the robot control device may generate a statistical report including information about the number of times that the abnormal state is generated according to a component, an operation type, a movement speed, a surrounding environment (e.g., a temperature, a slope, or an altitude) of the at least one external robot, based on the raw data and the data associated with the abnormal state. For example, the statistical report may include statistical data associated with the abnormal state generated in the at least one external robot. For example, the robot control device may generate a statistical report for each specified duration (e.g., a daily statistical report, a weekly statistical report, a monthly statistical report, and an annual statistical report).

According to an embodiment, in operation 930, the robot control device may provide the statistical report to at least one of at least one external robot or an external user device (e.g., a user terminal, a PC, an application, and/or a manager device associated with the external robot).

According to an embodiment, in operation 940, the robot control device may update an abnormal state response rule based on the statistical report.

According to an embodiment, the respective operations of FIG. 9 may be performed after the respective operations of FIG. 8 or at least some of the respective operations of FIG. 9 may be performed at the same time, and the operations of FIGS. 8 and 9 may be integrated and performed into one embodiment.

Figure 10:
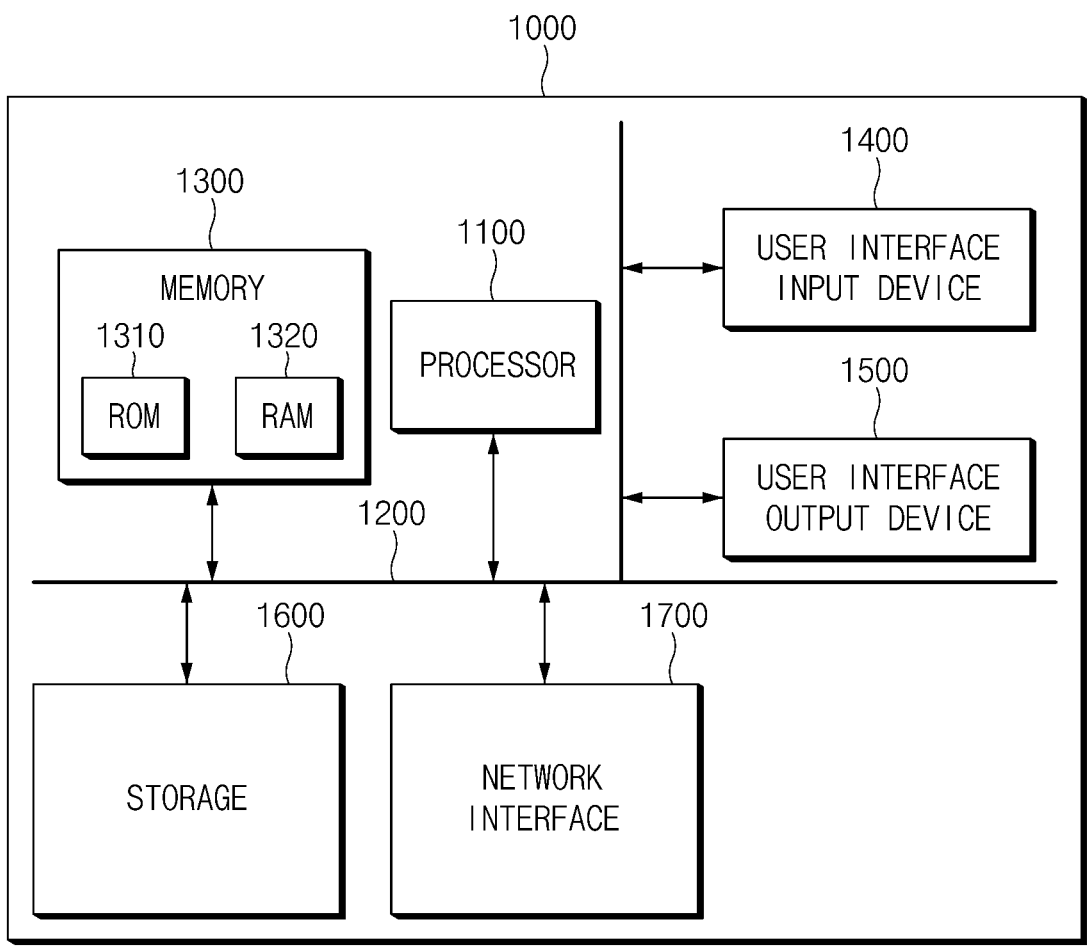
FIG. 10 illustrates a computing system according to an embodiment of the present disclosure.

FIG. 10 illustrates a computing system according to an embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The robot control device and the robot management method thereof according to embodiments of the present disclosure may facilitate an immediate and rapid response and measure when detecting an abnormal state of the robot.

The robot control device and the robot management method thereof to embodiments of the present disclosure may reduce a delay of communication with the outside and may improve communication performance.

The robot control device and the robot management method thereof according to embodiments of the present disclosure may process authentication for each service (or module) of the robot control device in an integrated manner to increase authentication processing efficiency.

The robot control device and the robot management method thereof according to embodiments of the present disclosure may provide statistical data associated with operation and an abnormal state of the robot.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A micro service architecture (MSA)-based robot control device, comprising:

a robot state detector configured to recognize an abnormal state generated in at least one external robot based on raw data received from the at least one external robot and provide an external user device with an alarm associated with the abnormal state based on a predetermined abnormal state response rule;

a log database configured to store the raw data and data associated with the abnormal state;

a robot manager configured to transmit a command to control at least one of an operation or a state of the at least one external robot to the at least one external robot, based on the abnormal state response rule; and a gateway configured to process communication between each component included in the MSA-based robot control device and the at least one external robot using a first protocol or to process communication between each component included in the MSA-based robot control device and the external user device using a second protocol, wherein the robot state detector is configured to:

generate, based on sensor data received from the at least one external robot, a map associated with an operation area of the at least one external robot, set, based on the generated map, the operation area of the at least one external robot, receive, from the at least one external robot, coordinate information based on the map indicating a location of the at least one external robot, and recognize that the abnormal state is generated, based on detecting that the at least one external robot deviates from the set operation area based on the coordinate information.

2. The MSA-based robot control device of claim 1, wherein the abnormal state response rule includes a rule associated with whether to provide an alarm depending on at least one of a state of a robot, a location of the robot, a speed of the robot, or an environment around the robot and a response operation of the robot.

3. The MSA-based robot control device of claim 1, wherein the gateway communicates with the at least one external robot using a g remote procedure calls (gRPC) protocol and communicates with the external user device using a restful application programming interface (REST API) protocol.

4. The MSA-based robot control device of claim 1, further comprising:

an authenticator configured to perform authentication processing procedures for the respective components included in the robot control device in an integrated manner, when communicating between at least some of the at least one external robot, the external user device, or the respective components included in the robot control device.

5. The MSA-based robot control device of claim 1, further comprising:

a statistics generator configured to generate a statistical report including information about a quantity of times that the abnormal state is generated according to a component, an operation type, a movement speed, a surrounding environment, or a location of the at least one external robot, based on the raw data and the data associated with the abnormal state and provide at least one of the robot state detector or the external user device with the statistical report.

6. The MSA-based robot control device of claim 5, wherein the robot state detector updates the abnormal state response rule based on the statistical report.

7. The MSA-based robot control device of claim 1, wherein the robot state detector divides the map into a plurality of areas, sets a number of robots operable for each of the plurality of divided areas, and recognizes that the abnormal state is generated, when detecting that the number of robots which are operating in each of the plurality of areas is greater than a specified threshold.

8. The MSA-based robot control device of claim 1, wherein the log database indexes the raw data and the data associated with the abnormal state and determines a storage duration for the indexed raw data and data associated with the abnormal state based on a specified storage policy.

9. The MSA-based robot control device of claim 8, wherein the log database receives a request of data conforming to a specified condition between the raw data or the data associated with the abnormal state from the at least one external robot or the external user device and provides the at least one external robot or the external user device with the data conforming to the specified condition, in response to the request.

10. A robot management method of an MSA-based robot control device, the robot management method comprising:
    receiving raw data from at least one external robot;
    recognizing an abnormal state generated in the at least one external robot based on the raw data;
    providing an external user device with an alarm associated with the abnormal state based on a predetermined abnormal state response rule; and
    transmitting a command to control at least one of an operation or a state of the at least one external robot to the at least one external robot, based on the abnormal state response rule,
    wherein the recognizing of the abnormal state comprises:
        generating, based on sensor data received from the at least one external robot, a map associated with an operation area of the at least one external robot;
        setting, based on the generated map, the operation area of the at least one external robot;
        receiving, from the at least one external robot, coordinate information based on the map indicating a location of the at least one external robot;
        recognizing that the abnormal state is generated, based on detecting that the at least one external robot deviates from the set operation area based on the coordinate information; and
        using a gateway of the MSA-based robot control device, communicating with the at least one external robot using a first protocol and communicating with the external user device using a second protocol.

11. The robot management method of claim 10, wherein the abnormal state response rule includes a rule associated with whether to provide an alarm depending on at least one of a state of a robot, a location of the robot, a speed of the robot, or an environment around the robot and a response operation of the robot.

12. The robot management method of claim 10, wherein the communicating with the at least one external robot and the communicating with the external user device comprises:
    communicating with the at least one external robot using a gRPC protocol and communicating with the external user device using a REST API protocol.

13. The robot management method of claim 10, further comprising:
    storing the raw data and data associated with the abnormal state.

14. The robot management method of claim 13, further comprising:
    indexing the raw data and the data associated with the abnormal state; and
    determining a storage duration for the indexed raw data and data associated with the abnormal state based on a specified storage policy.

15. The robot management method of claim 13, further comprising:
    receiving a request of data conforming to a specified condition between the raw data or the data associated with the abnormal state from the at least one external robot or the external user device; and providing the at least one external robot or the external user device with the data conforming to the specified condition, in response to the request.

16. The robot management method of claim 13, further comprising:
    generating a statistical report including information about a quantity of times that the abnormal state is generated according to a component, an operation type, a movement speed, a surrounding environment, or a location of the at least one external robot, based on the raw data and the data associated with the abnormal state; and
    providing at least one of the at least one external robot or the external user device with the statistical report.

17. The robot management method of claim 16, further comprising:
    updating the abnormal state response rule based on the statistical report.

18. The robot management method of claim 10, further comprising:
    dividing the map into a plurality of areas;
    setting a number of robots operable for each of the plurality of divided areas; and
    recognizing that the abnormal state is generated, when detecting that the number of robots which are operating in each of the plurality of areas is greater than a specified threshold.

19. A micro service architecture (MSA)-based robot control device, comprising:
    at least one processor; and
    a memory storing instructions that, when executed by the at least one processor, are configured to cause the MSA-based robot control device to:
        detect, based on raw data received from at least one external robot, an abnormal state generated in the at least one external robot;
        provide, to an external user device and based on an abnormal state response rule, an alert associated with the abnormal state;
        store the raw data and the data associated with the abnormal state;
        transmit, to the at least one external robot and based on the abnormal state response rule, a command to control at least one of an operation or a state of the at least one external robot; and
    a gateway configured to process communication, with the at least one external robot, that uses a first protocol and to process communication, with the external user device, that uses a second protocol,
    wherein the instructions, when executed by the at least one processor, are further configured to cause the MSA-based robot control device to:
        generate, based on sensor data received from the at least one external robot, a map associated with an operation area of the at least one external robot,
        set, based on the generated map, the operation area of the at least one external robot,
        receive, from the at least one external robot, coordinate information based on the map indicating a location of the at least one external robot, and
        recognize that the abnormal state is generated, based on detecting that the at least one external robot deviates from the set operation area based on the coordinate information.

\* \* \* \* \*